Jan. 4, 1938.  G. R. GREENSLADE  2,104,643
METHOD OF TESTING AND APPARATUS THEREFOR
Filed Dec. 13, 1934  4 Sheets-Sheet 1
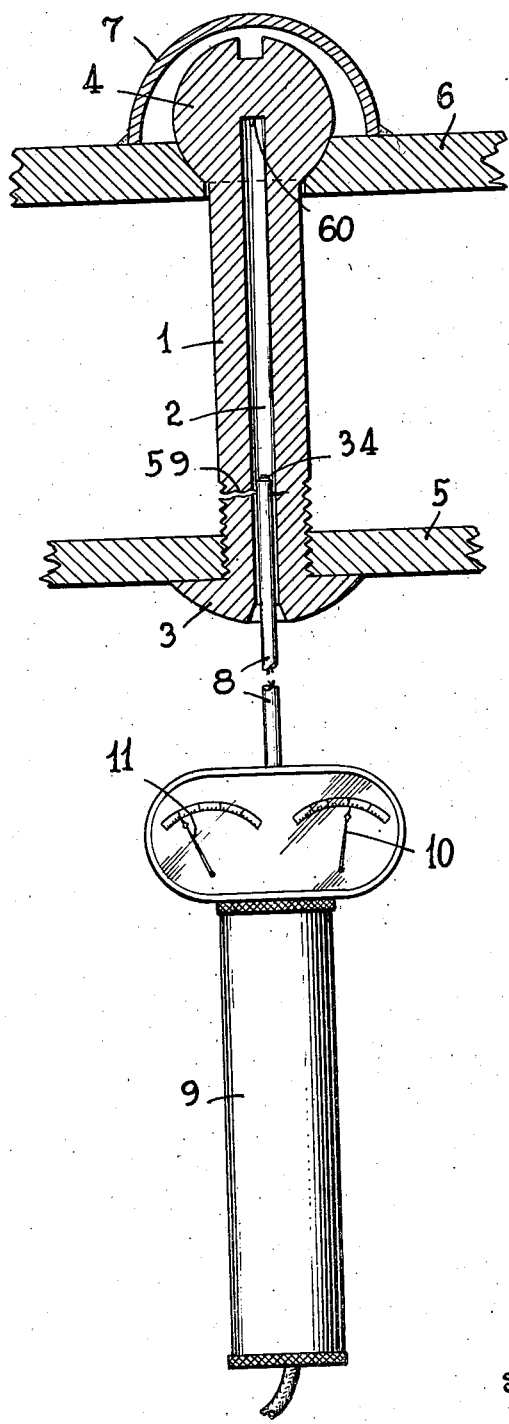
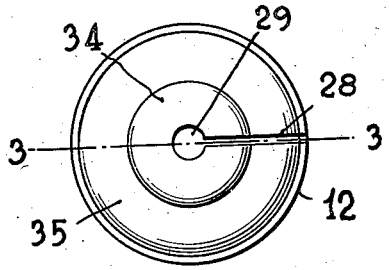
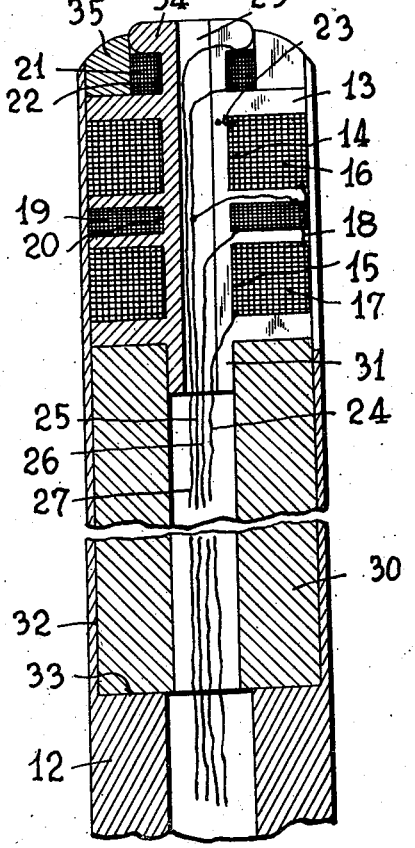
Inventor
Grover R. Greenslade
By Frank H. Wiech.
Attorney Jan. 4, 1938.  G. R. GREENSLADE  2,104,643
METHOD OF TESTING AND APPARATUS THEREFOR
Filed Dec. 13, 1934  4 Sheets-Sheet 2
FIG. 4.
FIG. 5.
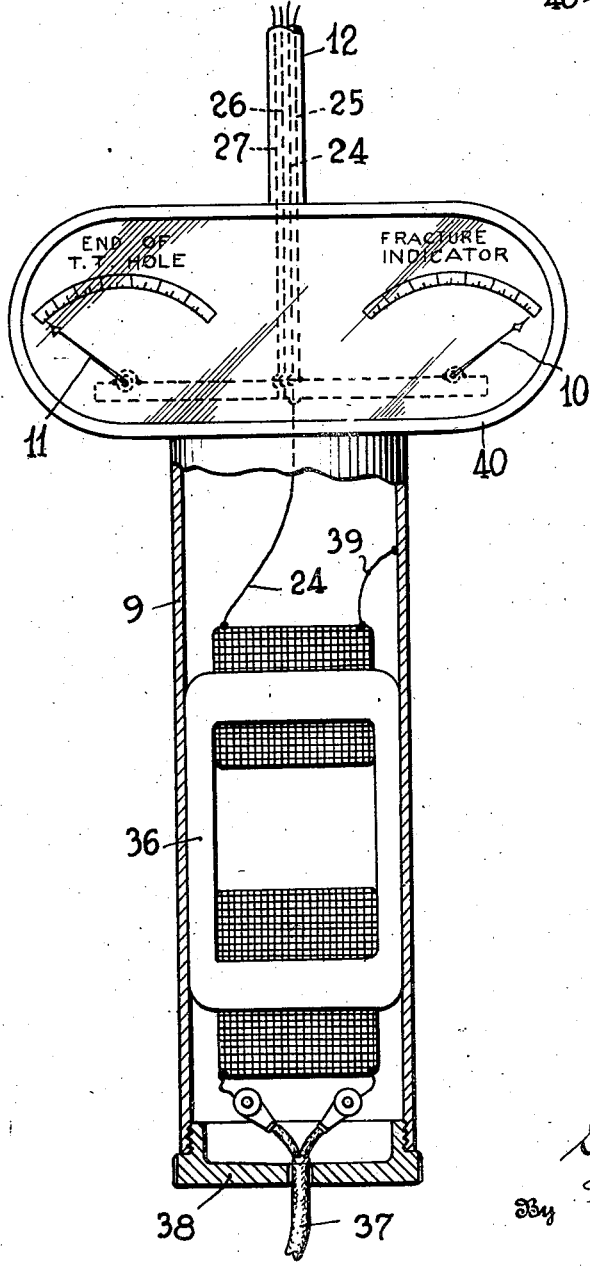
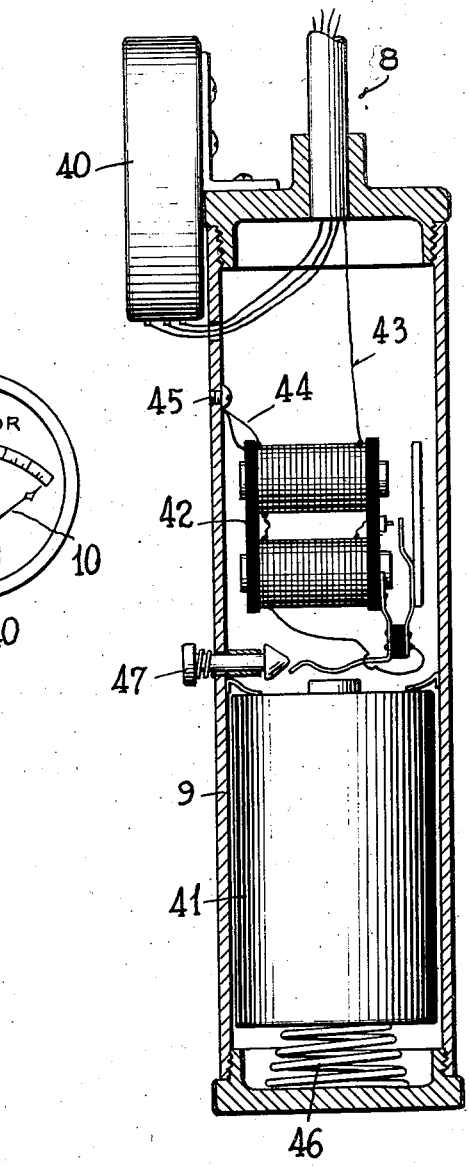
Inventor
Grover R. Greenslade
By Frank H. Wisch.
Attorney Jan. 4, 1938. G. R. GREENSLADE 2,104,643
METHOD OF TESTING AND APPARATUS THEREFOR
Filed Dec. 13, 1934 4 Sheets-Sheet 3
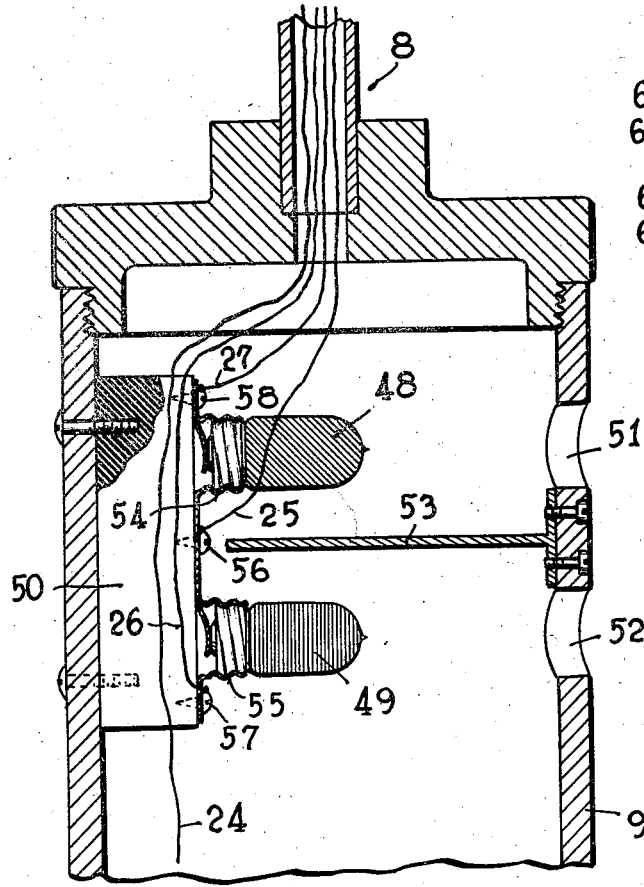
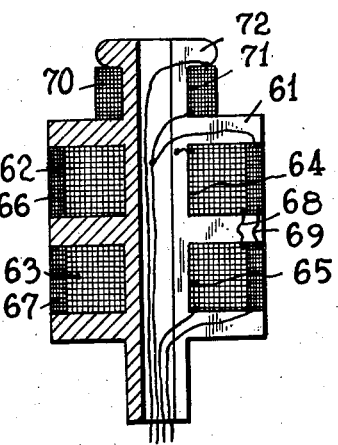
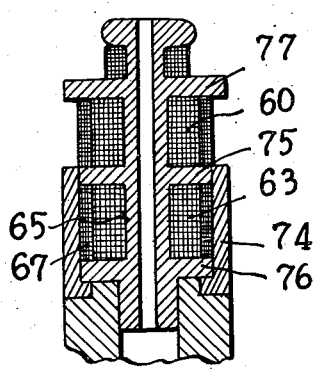
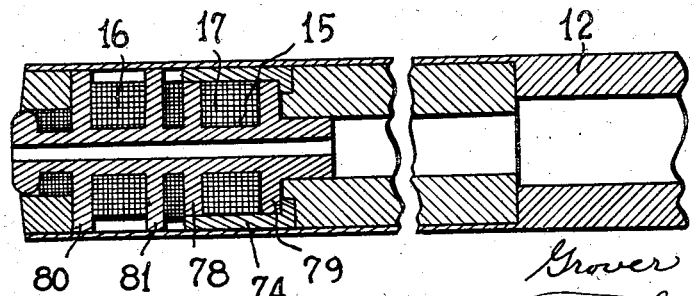
Inventor
Grover R. Greenslade
By Frank H. Wisch
Attorney Inventor
Grover R. Greenslade
By Frank H. Wisch
Attorney Patented Jan. 4, 1938

2,104,643

UNITED STATES PATENT OFFICE 2,104,643

METHOD OF TESTING AND APPARATUS THEREFOR

Grover R. Greenslade, Scott Township, Allegheny County, Pa., assignor to Pittsburgh Dry Stencil Company, a corporation of Pennsylvania Application December 13, 1934, Serial No. 757,379

6 Claims. (Cl. 175—183)

This invention relates to improvements in apparatus for and methods of testing metal objects to determine the condition thereof. More particularly the invention relates to testing of metallic objects having passage-ways therein, by the insertion of electrical means in said passageways to determine the presence or absence of fractures in such objects.

Heretofore various types of instruments have been invented and used for testing or inspecting staybolts for instance. Some of these instruments have served merely to indicate the condition of a telltale hole of a telltale staybolt. Others have served merely as means for determining whether or not a bolt is broken or fractured. In my copending applications Serial No. 742,656, filed September 4, 1934, and Serial No. 757,378, filed Dec. 13, 1934, I have disclosed instruments in which there are effectively combined, means that serve both to indicate the condition of a telltale hole of a telltale staybolt as well as the condition of the staybolt itself.

In the above-mentioned copending applications, I have shown and described testing implements whereby the condition of a bolt is determined by means of electromagnetic induction. In both instances, the instruments comprise an exploring rod associated with means in which current is induced by a magnetic flux of alternating polarity. As one example of the source of the flux, is shown an electromagnet applied so as to set up electromagnetic disturbances in the bolt to be tested. Variations in the magnitude of the induced current are noted by indicator means by which the presence or absence of fractures in a bolt are determined. An electromagnetic energizing device must be separately applied and an electromagnet used for this purpose must be of considerable bulk.

The present invention, although it operates on electromagnetic principles, requires no such supplementary apparatus, inasmuch as the testing implement itself contains all of the necessary energizing means. As will be seen, the present invention is simple in construction and easy to operate in that no auxiliary apparatus or equipment is needed. It comprises means whereby the condition of every breakable portion of a bolt, for instance, may be determined or in other words every part of a bolt that renders it effective as a stay for the opposite plates of a boiler. More specifically the apparatus of the present invention includes means insertable in a telltale hole of a telltale staybolt which means include energizing means and means for conducting current induced by the said energizing means to indicating means whereby an operator can detect the presence of obstructions in the telltale hole and of defects in the bolt. It is important to note that while heretofore devices have been used for determining whether a telltale hole is open its entire length, such devices will operate only when electrical contact with the original closed end of a telltale hole is made. In the present device, means are associated with the fracture detecting means, requiring no such electrical contact and yet such first-named means serve to indicate the presence or absence of serious obstructions in a telltale hole.

The present invention is designated herein and particularly in the following description, as a device for testing staybolts. It has a broader application, however, in that it may be used in testing hollow crank pins and hollow axles on freight and passenger cars for railroads or for testing any ferrous tubular means and particularly portions thereof that are not readily accessible.

Advantages in the use of the instrument will be apparent, and the construction thereof will be understood from the detailed description that follows and from the illustrated examples given in the accompanying drawings, in which Figure 1 is a view showing a testing instrument in side elevation and the manner in which it is employed in testing a telltale staybolt, the staybolt being shown in section;

Figure 2 is an enlarged end view of the free end of the testing rod shown in Figure 3;

Figure 3 is a view on line 3—3 of Figure 2 showing an enlarged longitudinal section of means insertable in a telltale hole of a staybolt and for exploring the same;

Figure 4 is an enlarged longitudinal view, partly in section, of a portion of the testing implement shown in Fig. 1;

Figure 5 is an enlarged longitudinal, sectional view of a portion of a testing implement, showing a modified internal arrangement;

Figure 6 is an enlarged, fragmentary, sectional view showing another modification of interior equipment;

Figure 10:
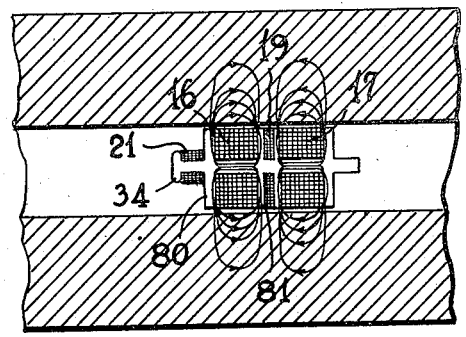
Figure 13:
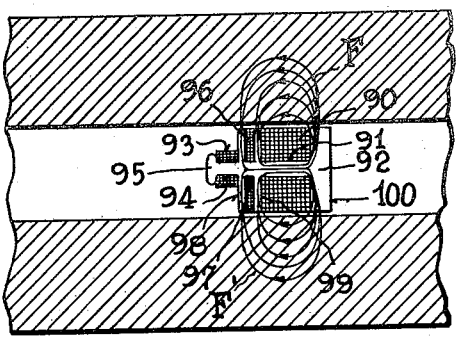
Figure 11:
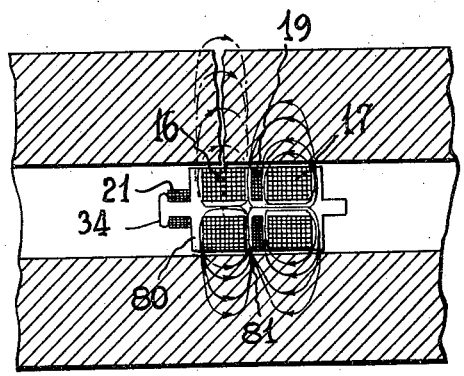
Figure 14:
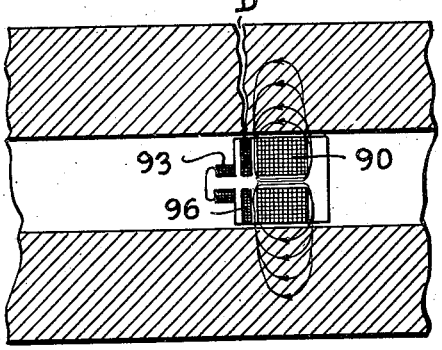
Figure 12:
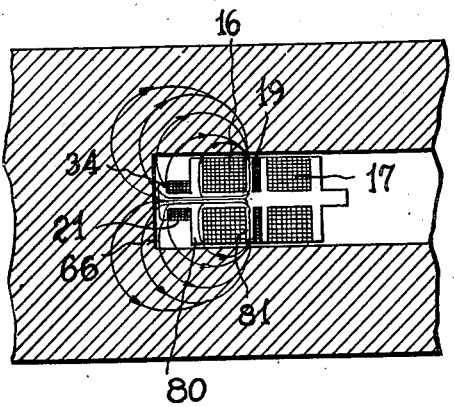
Figure 15:
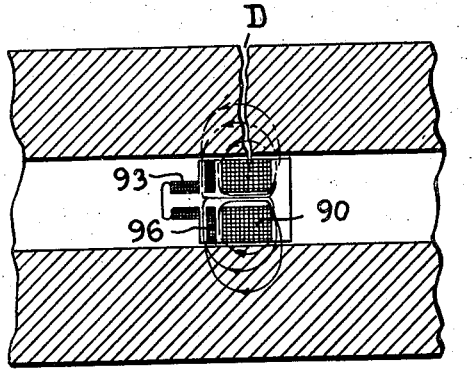

Figures 7, 8, and 9 are enlarged longitudinal, sectional views of modifications of an element employed in the testing implement;

Figures 10, 11, and 12 illustrate the manner in which the device shown in Figs. 1, 2, and 3 operates; and Figures 13, 14, and 15 illustrate the manner of operation of a testing implement provided with a modification of the element shown in Figs. 10, 11, and 12.

Referring to Figure 1, one form of my device is shown in use for ascertaining the condition of a telltale staybolt 1. The latter is provided with a telltale hole 2 that extends axially from the rivetted end 3 into but not through the headed end 4. The bolt shown is of a flexible type and is associated with the inner or firebox sheet 5 and the outer or wrapper sheet 6 of a locomotive boiler. A cap 7 encloses the head 4 and is welded to the sheet 6.

Only one type of bolt is shown in the drawings. It is to be understood however that any or all types of telltale staybolts, rigid or flexible, that have a passage extending axially, partly or entirely therethrough, may be tested.

The testing instrument comprises an exploring rod 8 adapted to be inserted in a telltale hole of a staybolt, a handle 9 to which the exploring rod is rigidly attached, indicating means 10 for determining whether or not a bolt is fractured, and additional indicating means 11 for determining whether or not the telltale hole is open substantially its entire length.

The construction of the exploring rod 8 and the internal equipment thereof is shown in detail in Figures 2 and 3. The rod 8 comprises a tubular member 12 in the free end of which is positioned a multiple or compound spool member designated generally by the numeral 13. This member is made of magnetic metal, for example, soft iron such as is ordinarily employed in cores for electromagnets.

Electrically matched and opposed energizing coils are provided for the member 13 in spool sections 14 and 15 respectively. In the spool section 14, for instance, a left-hand energizing winding 16 is provided, and in the spool section 15 a right-hand energizing winding 17 is provided. The number of turns in each of these windings is such that they provide opposed magnetic fields which under normal conditions are balanced one against the other so that a zone between the two coils 16 and 17 is magnetically neutral. These coils are connected in series, as shown, by a wire 18.

A separate coil 19 is provided in the spool section 20 between the spool sections 14 and 15, namely the neutral zone between the opposed energizing coils 16 and 17. Another coil 21 is wound in the spool section 22 at the outer end of the spool member 13. The wiring throughout is insulated and of any desirable gage.

The inner end of the wire of coil 16 is grounded at 23 in the spool member 13. Extending from the inner end of the wire of coil 17 is a lead wire 24 which passes through the tubular member 12 to the handle and is connected to one terminal of an alternating current source. A wire connected to the other terminal of said source is grounded in the handle 9, as will be described below. As is readily seen, the circuit for the energizing coils is completed through the handle 9, the tubular member 12, and through the spool member 13 which makes electrical contact with the tubular member 12.

The ends of the wires of coils 19 and 21 are connected to lead wires which also pass through the tubular member 12 to the handle 9 and are connected to indicating means in the manner described below. One end of the wire in each of the coils 19 and 21 may be connected to a common lead wire 25. The other end of the wire of coil 19 is connected to a lead wire 26, and the other end of the wire in coil 21 is connected to a lead wire 27.

If desired no ground connections and no common lead wires need be employed, but leads from all the coils, for instance six leads in the device illustrated in Fig. 3, may be brought through the rod to the handle.

In Figures 2 and 3 the illustration is drawn to a scale of several times the actual size of the testing implement which itself must be made small enough to pass within a telltale hole about $\tfrac{3}{16}$ to $\tfrac{7}{32}$ of an inch in diameter. It can be seen therefore that the reduction in size of the parts for this purpose necessitates means for easily passing the various lead wires from the coils to the handle 9. To accomplish this the member 13 is slotted. The section thereof in Figure 3 is taken through the slot. This slot 28 extends through one-half of the member 13 to the centerhole 29 and through the encasing wall of the tubular member 12 as illustrated in Figure 2. The slot 28 serves to prevent heat formation and energy losses from eddy currents. As indicated above the slot also serves with the centerhole 29 to form convenient passages for all connecting and lead wires.

The successful operation of my invention does not require the complete elimination of wasteful eddy currents but such elimination materially increases the electrical efficiency of the device.

For convenience in winding the coils on the spool member 13, a brass connecting tube 30 of any suitable length may be soldered to the end 31 of the spool member 13. The tube 30 serves as a handle for holding the spool while the various coils are being wound and also as a means for securing the spool within the tubular member 12. The end of the tubular member 12 which is brass may be bored out to fit the connecting tube 30 and the spool member 13. The tube 30 and the tube 12 may be soldered at 32 and 33. The shoulder provided at 33 serves the purpose of withstanding shock which may occur when the testing implement is thrust very vigorously against the end of the telltale hole.

The tip 34 or outer end of the spool member 13 is reduced in size for the reason indicated below. A brass ring 35, slotted as shown in Figure 2 and inserted between the coil 21 and the tube 12 adjacent its end, serves as an enclosure means and to protect the winding in the coil 21.

The power line for supplying alternating current to the energizing coils 16 and 17 may pass through the handle 9 and may be connected to a transformer (not shown) outside the handle 9, or to a transformer 36 positioned within the handle of the testing instrument as shown in Fig. 4. An A. C. power line 37 passes through a cap 38 on the end of the handle 9. Appropriate connections are made to the primary coil of the transformer 36 and to the secondary coil. The wire connection 39 is grounded in the handle 9 to make connection with the grounded end 23 of the energizing coil 16 as set forth above regarding Fig. 3. The wire 24 leads to the energizing coil 17.

The common lead wire 25 from the coils 19 and 21 leads to a common terminal of the double indicating device 40. The lead wire 26 from the coil 19 is connected to conduct induced current to the fracture indicator 10, and the lead wire 27 from the coil 21 is connected to conduct induced current to the indicator 11 for indicating when the tip of the exploring rod 8 has reached or is in proximity of the original closed end of a telltale hole in a telltale bolt. The indicators are of the nature of milammeters and are highly sensitive to fluctuations in current.

Alternatively, any source of interrupted direct current may be employed for the purpose of energizing the coils 16 and 17. Fig. 5 illustrates the use of a dry battery 41 within the handle 9 as a source of direct current. In this instance an interrupter 42 is provided and one of the secondary leads 43 thereof goes to one end of one of the opposed energizing coils in the exploring rod 8 while the other 44 of the secondary leads is grounded at 45 in the handle 9. The primary of the interrupter is connected to the battery circuit, as shown, through the handle 9 and the spring 46. A button 47 may be used to close the battery circuit.

Fig. 6 illustrates the use of lamps for indicating the presence of fractures in a bolt and the proximity of the end of a closed telltale hole. The lamps may be mounted within the hollow handle 9 in any convenient manner. Other indicating means such as buzzers may also be employed. The lamps 48 and 49 are mounted on a suitable insulating base 50 which is fastened inside the handle so that the lamps are opposite openings 51 and 52 respectively. The lamps may be of different colors, lamp 48 may be green to indicate the proximity of the end of the telltale hole, and lamp 49 may be red to indicate a fractured bolt. A partition 53 positioned between the lamps separates the light from the two lamps. The lamps 48 and 49 are mounted in sockets 54 and 55 respectively. The common lead wire 25 from the fracture indicating coil 19 and the telltale hole indicating coil 21, is connected to the terminal 56. The other lead wire 26 for the coil 19 is connected to the terminal 57. The lead wire 27 for the coil 21 is connected to the terminal 58. The lamp connections in the sockets are made in a manner well understood.

In conducting a test with an exploring rod having the coils arranged therein as shown in Fig. 3, the rod 8 is inserted in a telltale hole as shown in Fig. 1 and while moving it inwardly the indicator 10 is watched and any fluctuation of the reading is noted. If the bolt 1 has a fracture in it as for instance at 59, there results a succession of changes in the reading on the indicator 10 as the end of the rod passes the fracture. When the end of the telltale hole 2 has been reached, there is a rise in the reading on the indicator 11 showing that for all practical purposes the telltale hole 2 may be considered open its entire length.

With my present device, as indicated in the beginning it is immaterial whether or not the tip of the rod 8 makes electrical contact with the end of the telltale hole. The indicator 11 will indicate the proximity of the end of the telltale hole before the tip 34 actually touches the end 60. Even if the surface of the end 60 is coated with corroded matter or with a film of sediment, the indicator 11 will register an increase in current when the tip touches such corroded matter or film. If there is a relatively large accumulation of sediment or rust in the telltale hole the indicator 11 will not register an increase in current when the tip reaches such obstructions. When this takes place, the operator will know that the telltale hole must be cleaned out before the test is completed.

As shown in the drawings, various forms of spool members are possible. The spool member 13 in Fig. 3 has a normally neutral groove between the opposed energizing coils, in which groove the fracture detecting coil is wound. In Fig. 7 there are only three spool sections in the spool member 61. Opposed energizing coils 62 and 63 which are matched are wound in the grooves or spool sections 64 and 65 respectively. The fracture detecting winding includes coils 66 and 67 which are wound on the outside of the opposed energizing coils in the two grooves 64 and 65. The coils 66 and 67 are balanced but not opposed. The coils 62 and 63 are connected in series by a wire 68. The coils 66 and 67 are connected in series by a wire 69. The coil 70 employed for detecting the proximity of the end of the telltale hole is wound in the groove 71 adjacent the reduced end 72.

The electrical connections to the coils on the spool member 61 in Fig. 7 are made in substantially the same manner as the connections to the coils on the spool member 13 in Fig. 3. In the use of a testing instrument equipped with the spool member 61, the impulses obtained in the detecting coils are substantially similar to those obtained with the spool member 13 under similar conditions.

In the modifications shown in Figs. 8 and 9, the spool members shown are each provided with a cylindrical ferrous shield member 74 for shielding one of the opposed energizing coils. The form of spool member shown in Fig. 8 corresponds in other respects to the form shown in Fig. 7 and that shown in Fig. 9 corresponds to the form shown in Fig. 3. In Fig. 8 the shield 74 is shown incasing the spool section 65 in which the energizing coil 63 and the portion 67 of the detector winding are located. The shield extends over the edges of the flanges 75 and 76 which are less in diameter than the flange 77 by the thickness of the shield 74.

In Fig. 9 the shield 74 is shown incasing the spool section 15 in which the energizing coil 17 is located. The flanges 78 and 79 are in this case of less diameter than the flanges 80 and 81 so that the spool and the shield will assume the relative positions in the tubular member 12 as shown. The slot mentioned above that passes through the spool member also passes through the shield 74.

When a testing rod is equipped as above described, and the tester tip moves past a fracture, an impulse is observed when the fracture is opposite the unshielded energizing coil namely opposite coils 60 and 16 shown in Figs. 8 and 9 respectively. When the fracture is opposite the shielded energizing coils 63 or 17, the latter are not materially affected by the proximity of the said fracture due to the fact that the shield 74 forms an easy path of return for the magnetic lines of force generated by the coils 63 (Fig. 8) or 17 (Fig. 9).

As indicated above, therefore, two impulses in close succession are received when a pilot tip of a rod equipped as illustrated in Figs. 3 and 7 is moved past a fracture, and a single major impulse results when a pilot tip of a rod equipped as illustrated in Figs. 8 and 9 is moved past a fracture. It is evident that an operator experienced in the use of the tester will find any one of the embodiments of this invention simple and positive when employed in locating a fracture.

The theory of the operation of my device may best be explained by reference to a diagrammatic representation of the fields about the coils in the rod at various stages of the test. In Figs. 10, 11, and 12, a core is shown with an arrangement of coils such as that in the rod 8 in Fig. 3. Let us assume that the alternating current is flowing in the opposed energizing coils 16 and 17. When the rod is in the telltale hole of a flawless bolt and remote from the end of the hole, the coils of the implement are surrounded by a relatively heavy and continuous mass of ferrous metal of high magnetic permeability which is capable of forming a path for the easy flow of the magnetic lines of force as they link around the energizing coils. The lines of force at a given instant assume substantially the course shown in Fig. 10. The fracture indicating coil 19, under such conditions, is in a neutral zone so that the fracture indicator will not register. Practically no lines of force travel forward sufficiently to pass through the tester tip 34. Therefore the telltale hole indicator will register substantially no current. It is noted that the tip 34 may to advantage be substantially less in diameter than that of the rest of the spool member. This insures the proper travel of the lines of force.

When the tester tip is in the vicinity of a fracture in the bolt as illustrated in Fig. 11, an unbalanced condition exists and this unbalanced condition beecomes pronounced when the middle portion of coil 16 for instance is approximately opposite the fracture. Due to the presence of this fracture there is a partial break in the easy path of flow of magnetic lines of force in the field produced by the coil 16, which tends to weaken or decrease the magnetic strength of this field (the weakened field is illustrated by means of broken lines) with the result that the magnetic field produced by the energizing coil 17 on account of its being somewhat less opposed than formerly will spread out so that some of the lines in the latter field will link through the disc or flange portion 81 of the spool member and thus encircle the detecting coil 19. The linking of these alternating magnetic lines around the coil 19 brings the latter within the field of the coil 17 and there is generated in the coil 19 an indicating current and the fracture indicator imparts a warning signal to the operator. A signal is also given when the fracture is opposite the opposed coil 17, as is readily understood. A rod equipped with the spool members shown in Figs. 3 and 7 will give two signals when the tester tip in each case is moved past a fracture. One signal is all that is necessary. In order to avoid a double signal one or the other of the coils 16 or 17 may be shielded with material that is easily permeated by magnetic lines of force and that serves as a conductor therefor, as explained above.

When the tester tip reaches the end of a telltale hole or a position near the end as shown in Fig. 12, many of the lines of force pass through the tip 34. A current is therefore induced in the coil 21 and the indicator connected to this coil reveals the fact that the telltale hole is open substantially its entire length.

In telltale bolts of the rigid or flexible types, a telltale hole generally extends axially the entire length of the bolt or in the case of a flexible bolt a telltale hole extends generally from the riveted end well into the head usually not less than one-third of its diameter. In exploring a telltale hole with the device of the present invention it is possible to determine the condition of a bolt in every breakable part that affects its serviceableness. This includes more specifically the shank of a bolt, the threaded portions, and, in a flexible bolt, the shank and an adjacent portion of the head that affects its flexibility.

The value of having associated with the fracture detecting coil, a detecting coil such as 21 is obvious from the following:—

If rust or scale or any foreign matter has accumulated within a telltale hole from any cause whatsoever and has at some point built up to such an extent as to clog the telltale hole and thus prevent the passage of the rod of the testing implement, the operator might be led to believe that the tip of the testing implement had reached the inner end of the telltale hole and that the inspection of the bolt was therefore completed.

Such a conception of the actual condition would obviously be dangerous inasmuch as the staybolt might be fractured at some point beyond the position at which the pilot tip of the tester rod had been stopped by the accumulation of foreign material. In this way a bolt containing a fracture might be pronounced sound by the operator who is inspecting the staybolts of the boiler under test. It is therefore essential that means be provided whereby the operator may know that the pilot tip of the testing rod has progressed inwardly to a point within the head in proximity to the original closed end of the telltale hole or that it has been stopped by accumulations within the telltale hole at some point along the way. If therefore the operator observes, on exploring a telltale hole no indication, through the instrumentalities of the testing implement as provided in the present invention, that the tip of the instrument has reached a position within the head of the bolt when he has thrust the testing implement in as far as possible, he will then know that an obstruction exists within the telltale hole and that this obstruction must be removed by a drill or other suitable cleaning device before the test of the staybolt may be completed.

The manner in which the coil 12 functions to provide the necessary indication just discussed may be further explained as follows:—

When the pilot tip 34 (Figs. 10–12) of the testing implement is remote from the inner end of the telltale hole the alternating magnetic field produced by energizing coil 16 will pass almost entirely along a circuit comprising a portion of the axis of the spool, the flange member 80, a portion of the body of the staybolt and the flange member 81 inasmuch as these ferrous parts form a circuit of easy flow for the magnetic lines of force generated by the current in coil 16. Since the flange 34 has a diameter which is small as compared to flange 80, when the tip of the testing implement is remote from the inner closed end of the telltale hole a relatively large gap exists between the ferrous metal of the flange 34 and the body portion of the staybolt. However, as the tester is thrust farther into the staybolt by the operator it can easily be seen that when the flange 34 of small diameter approaches the original closed end of the telltale hole of the flexible staybolt within the head of the bolt, the ferrous metal of the flange member 34 will come very close to the ferrous metal of the end wall of the telltale hole. This position will produce a supplementary path of easy flow through which some of the alternating lines of the magnetic field produced by the current in the coil 16 may spread out and thus relieve the congestion within the flange member 80. Such lines will therefore pass along a portion of the axis of the spool past flange member 80 and on through flange member 34 of small diameter, thence into the ferrous metal of the head of the bolt by transversing the gap between the end surface of flange member 34 and the end wall of the telltale hole of the staybolt and from there around through the metal of the staybolt head portion and back through flange member 81. In this way the linking of such lines around the coil 21 will generate within the coil 21 an alternating current which will be conveyed through lead wires to a separate suitable indicating device attached to or associated with the handle of the testing implement. It can be seen therefore that the operator will be able to determine with ease when the tip of the testing implement has reached a point in proximity of the original closed end of the telltale hole of a flexible staybolt.

Figures 13, 14, and 15 diagrammatically illustrate the operation of a modified arrangement of coils used in a tester tip of an exploring rod. With this type of tip the fracture indicator gives readings at all times but the readings fluctuate when the coils move past a fracture in a staybolt. As will be seen, opposed energizing coils are not essential for creating a field that will be affected by the presence of a fracture or a field, the alteration of which will give an indication of the presence of a fracture. A single energizing coil 90 is wound on a spool section 91 of a spool member 92 which may be attached to an exploring rod in any suitable manner. Electrical connections with a source of alternating current may be made as indicated above with respect to the other modifications. A coil 93 in spool section 94 adjacent the tip 95; and a coil 96 in spool section 97 between the spool sections 94 and 91, complete the detector equipment. The coil 93 is electrically connected to an indicator whereby a signal is given that the original closed end of a telltale hole is relatively close at hand. The coil 96 is electrically connected to an indicator whereby an operator is able to learn whether or not a fracture is in the bolt subjected to test. These connections may be made in the manner described above with respect to Fig. 3.

The field produced by the energizing coil 90, links around the end portions of the iron spool member 92 namely flanges 98, 99, and 100, and through the bolt as shown in Fig. 13. Some of the lines of force pass through the portion of the spool member which includes the fracture detecting coil 96 as shown by lines F and F'. These lines produce an alternating current in the coil 96 which current is conducted to an indicating device. If a fracture exists in the bolt as shown in Fig. 14 at D, and when the tester tip is moved past the fracture, fluctuations in the current are noted on the indicator to which the coil 96 is connected. When the coil 96 is opposite the crack, such lines as F F' are reduced and a decrease in current in coil 96 is indicated. When the coil 90 is opposite the crack D as shown in Fig. 15, a general weakening of the field results and this further results in a decrease in current induced in the coil 96.

As is seen from the foregoing, a single handy implement is provided for testing the condition of metal objects in a manner which is positive and certain. The means provided, very greatly simplifies the method of testing staybolts and the like inasmuch as all portions of the object tested are energized to the same extent, due to the positioning of the energizing unit within the exploring rod of the tester near the extreme end of the said rod and in proximity to the detecting means which enable an operator to conduct a complete test.

It is to be understood that although I have shown and described but a few of the preferred embodiments of my invention, the invention covers the broad principles as set forth and various alternatives in design and construction may be employed within the scope of the appending claims:

I claim:—

1. Apparatus for testing telltale staybolts, which apparatus comprises exploring means adapted to be inserted in a telltale hole of a telltale staybolt and adapted to be moved along the said telltale hole, means associated with the said exploring means for determining the condition of the bolt in every breakable part that renders the bolt effective as a stay for the plates of a boiler, and additional electrical means associated with the said second means for indicating when the free end of the said exploring means is in relatively close proximity to the original closed end of the said telltale hole and yet electrically insulated therefrom.

2. Apparatus for testing the condition of metal objects, which apparatus comprises means adapted to be inserted in a passage extending into a magnetizable metal object to be tested, the said means including coil means for generating a magnetic flux of alternating polarity, a core member on which the said coil means is wound, coil means for induced current developed in exploring the passage to determine the condition of the said metal object, and coil means for induced current developed when the said core member is in relatively close proximity to an original closed end of the said passage in the said metal object.

3. Apparatus for testing the condition of metal objects, which apparatus consists of a rod for insertion in a passage extending into a magnetizable metal object to be tested and for exploration of said passage, a core member mounted within the said rod adjacent the insertable end thereof; and means including coil means wound on the said core member for generating a magnetic flux of alternating polarity within the said passage, separate coil means wound on the said core member adjacent the first coil means, a handle for the said rod, and means associated with the said handle and in circuit with the said second coil means for indicating variations in current induced while exploring the said passage.

4. In apparatus for testing magnetizable metal objects having a passage extending into the body thereof, the original closed end of the said passage being subject to become covered with material that does not conduct electricity; exploring means insertable in and freely movable along the said passage to said original closed end thereof, and electrical means associated with the said movable exploring means for indicating when the free end of the said exploring means is in relatively close proximity to the said original closed end of the said passage and yet electrically insulated therefrom, the said electrical means including an electrical conductor supported at a free end of the said exploring means and positioned to be readily traversed by magnetic lines of force passing through the closed end of the said passage, and a signal means for indicating the said close proximity before the said closed end of the passage is reached.

5. In a method of testing magnetizable metal objects having a passage extending into the body thereof, the original closed end of the said passage being subject to become covered with material that does not conduct electricity; while generating a flux of alternating polarity in the said passage and exploring the same with means for conducting current induced by the flux, and without necessarily electrically contacting the said closed end, noting variations in the said induced current to determine the relative proximity of the said closed end as the exploring means approaches and before the said means touches the said closed end, thereby determining the presence or substantial absence of nonconducting accumulations in the said passage.

6. In apparatus for testing boiler staybolts of the telltale type, the said apparatus including a testing implement insertable in and, in the absence of obstructive accumulations, movable along the telltale hole of a telltale staybolt to the original closed end of the said telltale hole, and means for generating alternating magnetic flux; electrical conductor means positioned on the said implement to be readily traversed by magnetic lines of force passing through the closed end of the said telltale hole from the said magnetic flux generating means, and indicator means associated with the said electrical conductor means which provides an indication of the relatively close proximity of the said original closed end of the telltale hole and a stronger indication as the implement approaches or reaches the said original closed end of the telltale hole.

GROVER R. GREENSLADE.